United States Patent
Sakaki et al.

(10) Patent No.: US 9,856,362 B2
(45) Date of Patent: Jan. 2, 2018

(54) RUBBER COMPOSITION FOR TIRES AND PNEUMATIC TIRE

(71) Applicant: SUMITOMO RUBBER INDUSTRIES, LTD., Kobe-shi, Hyogo (JP)

(72) Inventors: Toshiaki Sakaki, Kobe (JP); Yuka Yokoyama, Kobe (JP); Seiji Hatano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/100,553

(22) PCT Filed: Nov. 27, 2014

(86) PCT No.: PCT/JP2014/081382
§ 371 (c)(1),
(2) Date: May 31, 2016

(87) PCT Pub. No.: WO2015/098419
PCT Pub. Date: Jul. 2, 2015

(65) Prior Publication Data
US 2016/0297947 A1 Oct. 13, 2016

(30) Foreign Application Priority Data
Dec. 27, 2013 (JP) ................................. 2013-272005

(51) Int. Cl.
| | | |
|---|---|---|
| C08K 3/36 | (2006.01) | |
| B60C 1/00 | (2006.01) | |
| C08C 1/04 | (2006.01) | |
| C08C 3/02 | (2006.01) | |
| C08L 7/00 | (2006.01) | |
| B60C 11/00 | (2006.01) | |
| C08K 5/548 | (2006.01) | |
| C08L 9/06 | (2006.01) | |

(52) U.S. Cl.
CPC ................. *C08K 3/36* (2013.01); *B60C 1/00* (2013.01); *B60C 1/0016* (2013.01); *B60C 11/0008* (2013.01); *C08C 1/04* (2013.01); *C08C 3/02* (2013.01); *C08K 5/548* (2013.01); *C08L 7/00* (2013.01); *C08L 9/06* (2013.01); B60C 11/005 (2013.01); B60C 2011/0016 (2013.01); C08K 2201/006 (2013.01); C08L 2205/02 (2013.01)

(58) Field of Classification Search
CPC .... C08K 3/36; C08K 5/548; C08K 2201/006; C08L 7/00; C08L 9/06; C08L 2205/02; B60C 1/00; B60C 1/0016; B60C 1/04; B60C 11/0008; B60C 11/005; B60C 2011/0016; C08C 1/04; C08C 3/02; Y02T 10/862

See application file for complete search history.

(56) References Cited

U.S. PATENT DOCUMENTS

2011/0166254 A1* 7/2011 Nishimura ............ B60C 1/0016
523/155
2014/0378593 A1 12/2014 Kagawa et al.

FOREIGN PATENT DOCUMENTS

| CN | 102585041 A | 7/2012 |
|---|---|---|
| CN | 103102548 A | 5/2013 |
| EP | 2 341 099 A1 | 7/2011 |
| JP | 3294901 B2 | 6/2002 |
| JP | 2006-213752 A | 8/2006 |
| JP | 2012-149134 A | 8/2006 |
| JP | 2012-116970 A | 6/2012 |
| JP | 2012-149134 A | 8/2012 |
| JP | 2012-241066 A | 12/2012 |
| JP | 2013-35902 A | 2/2013 |
| JP | 2013-245339 A | 12/2013 |

OTHER PUBLICATIONS

International Search Report (Form PCT/ISA/210) for International Application No. PCT/JP2014/081382, dated Jan. 27, 2015.
Kawahara et al., "Removal of proteins from natural rubber with urea," Polymers for Advanced Technologies, vol. 15, 2004, pp. 181-184.

* cited by examiner

*Primary Examiner* — Robert Jones, Jr.
(74) *Attorney, Agent, or Firm* — Birch, Stewart, Kolasch & Birch, LLP

(57) ABSTRACT

Provided are a rubber composition for tires that shows a balanced improvement in properties such as fuel economy, processability, heat aging resistance, abrasion resistance, wet-grip performance, performance on snow and ice, and handling stability, and a pneumatic tire formed from the rubber composition. The present invention relates to a rubber composition for tires, containing: a highly purified, modified natural rubber having a pH adjusted to 2 to 7, and a silica having a CTAB specific surface area of 180 m$^2$/g or more and a BET specific surface area of 185 m$^2$/g or more, and also relates to a pneumatic tire formed from the rubber composition.

17 Claims, No Drawings

RUBBER COMPOSITION FOR TIRES AND PNEUMATIC TIRE

TECHNICAL FIELD

The present invention relates to a rubber composition for tires, and a pneumatic tire formed from the rubber composition.

BACKGROUND ART

Surge in fuel prices and introduction of environmental regulations in recent years have created the demand for highly fuel-efficient tires, and there is a need that the tread, which largely contributes to fuel economy, be more fuel efficient. Since most treads contain natural rubber, the fuel economy of natural rubber also needs to be improved to improve the fuel economy of the entire tire.

Patent Literature 1, for example, discloses modification of natural rubber to improve fuel economy, in which natural rubber latex is combined with a surfactant and washed. However, this method can reduce the protein and gel contents to some extent, but not to desired levels, and further reduction in tan δ is desired. Moreover, heat aging resistance and other properties are also required for rubber for tires. However, the method of Patent Literature 1 cannot provide sufficient heat resistance and there is a need for improvement to simultaneously ensure fuel economy and heat aging resistance.

Natural rubber has a higher Mooney viscosity than other synthetic rubbers and is poor in processability. Usually, natural rubber is mixed with a peptizer and masticated to reduce the Mooney viscosity before use, which results in poor productivity. Further, since the mastication breaks the molecular chains of natural rubber, the resultant natural rubber unfortunately loses the high-molecular-weight polymer characteristics that natural rubber originally has, such as good fuel economy, abrasion resistance, and rubber strength.

Meanwhile, many tires these days have a two-layer structure consisting of a base tread and a cap tread. The cap tread, which is a component directly contacting the road surface, is expected to have properties to match various environments as well as abrasion resistance. For use in summer tires it is expected to have particularly wet-grip performance, while for use in studless winter tires it is expected to have particularly grip performance such as performance on snow and ice. Moreover, along with improvements in the performance of automobiles and the development of road networks, the base tread, which forms an inner component, also needs to impart improved handling stability, in particular during high speed driving, to tires.

As described above, rubber compositions for tires are desired which achieve further improvements in properties such as fuel economy, processability, heat aging resistance, abrasion resistance, wet-grip performance, performance on snow and ice, and handling stability.

CITATION LIST

Patent Literature

Patent Literature 1: JP 3294901 B

SUMMARY OF INVENTION

Technical Problem

The present invention aims to solve the above problems and provide a rubber composition for tires that shows a balanced improvement in properties such as fuel economy, processability, heat aging resistance, abrasion resistance, wet-grip performance, performance on snow and ice, and handling stability, and a pneumatic tire formed from the rubber composition.

Solution to Problem

The present invention relates to rubber composition for tires, containing: a highly purified, modified natural rubber having a pH adjusted to 2 to 7, and a silica having a CTAB specific surface area of 180 $m^2/g$ or more and a BET specific surface area of 185 $m^2/g$ or more.

Preferably, the modified natural rubber is obtained by removing non-rubber components in natural rubber, followed by treatment with an acidic compound, and the modified natural rubber has a pH of 2 to 7.

Preferably, the modified natural rubber is obtained by washing a saponified natural rubber latex and treating the washed saponified natural rubber latex with an acidic compound, and the modified natural rubber has a pH of 2 to 7.

Preferably, the modified natural rubber is obtained by washing a deproteinized natural rubber latex and treating the washed deproteinized natural rubber latex with an acidic compound, and the modified natural rubber has a pH of 2 to 7.

Preferably, the modified natural rubber has a phosphorus content of 200 ppm or less.

Preferably, the modified natural rubber has a nitrogen content of 0.15% by mass or less.

Preferably, the pH is determined by cutting the modified natural rubber into pieces at most 2 mm square on each side, immersing the pieces in distilled water, irradiating the immersed pieces with microwaves for extraction at 90° C. for 15 minutes, and measuring the resulting immersion water with a pH meter.

Preferably, the modified natural rubber has a heat aging resistance index of 75 to 120%, the heat aging resistance index being defined by the equation below based on Mooney viscosities ML (1+4) at 130° C. measured in accordance with JIS K 6300: 2001-1, Heat aging resistance index (%)=(Mooney viscosity of the modified natural rubber measured after heat treatment at 80° C. for 18 hours)/(Mooney viscosity of the modified natural rubber before the heat treatment)×100.

The rubber composition preferably contains a silane coupling agent.

The silica preferably has an average primary particle size of 16 nm or less.

Preferably, the modified natural rubber is prepared without mastication.

Another aspect of the present invention relates to a pneumatic tire, formed from the rubber composition for tires.

Advantageous Effects of Invention

The rubber composition for tires of the present invention contains a highly purified, modified natural rubber having a pH adjusted to 2 to 7, and a silica having a certain CTAB specific surface area and a certain BET specific surface area. Such a rubber composition can achieve a balanced improvement in properties such as fuel economy, processability, heat aging resistance, abrasion resistance, wet-grip performance, performance on snow and ice, and handling stability.

DESCRIPTION OF EMBODIMENTS

The rubber composition for tires of the present invention contains a highly purified, modified natural rubber having a pH adjusted to 2 to 7, and a silica having a CTAB specific surface area of 180 m$^2$/g or more and a BET specific surface area of 185 m$^2$/g or more.

The modified natural rubber has been highly purified and the pH of the modified natural rubber is adjusted to 2 to 7.

The modified natural rubber has been highly purified by removing non-rubber components such as proteins and phospholipids; further, the pH of the modified natural rubber is controlled at an appropriate value. Such a modified natural rubber improves processability, fuel economy, abrasion resistance, wet-grip performance, performance on snow and ice, and handling stability. Rubber can easily degrade when non-rubber components are removed therefrom or when the rubber is rendered basic or highly acidic. However, by adjusting the pH of the rubber within a predetermined range, the reduction of the molecular weight during storage is suppressed and thus good heat aging resistance is obtained. This makes it possible to prevent deterioration in rubber physical properties and improve the dispersibility of filler during kneading, thereby improving the balance of the various properties described above. The present invention also involves the incorporation of a specific silica, in addition to the modified natural rubber. This synergistically improves the balance of the above-described properties, thereby markedly improving the balance of the properties.

The expression "highly purified" means that impurities other than natural polyisoprenoid components, such as phospholipids and proteins are removed. The structure of natural rubber is like that in which an isoprenoid component is covered with these impurity components. By removing the impurity components, it is considered that the structure of the isoprenoid component is altered so that the interactions with compounding agents are changed to reduce energy loss, and durability is improved, and therefore a better quality rubber composition can be prepared.

The highly purified, modified natural rubber having a pH adjusted to 2 to 7 may be any modified natural rubber which has been highly purified by reducing the amount of non-rubber components and has a pH of 2 to 7. Specific examples include: (1) a modified natural rubber which is obtained by removing non-rubber components in natural rubber, followed by treatment with an acidic compound, and which has a pH of 2 to 7; (2) a modified natural rubber which is obtained by washing a saponified natural rubber latex and treating the washed saponified natural rubber latex with an acidic compound, and which has a pH of 2 to 7; and (3) a modified natural rubber which is obtained by washing a deproteinized natural rubber latex and treating the washed deproteinized natural rubber latex with an acidic compound, and which has a pH of 2 to 7.

As described above, the modified natural rubber can be prepared by, for example, methods of washing a saponified natural rubber latex or a deproteinized natural rubber latex with distilled water or the like and treating the washed latex with an acidic compound. It is essential to shift the pH to the acidic side and lower the pH relative to the pH of distilled water used in the water washing, by the treatment with an acidic compound. Distilled water usually does not have a pH of 7.00 but has a pH of approximately 5-6. If distilled water with such a pH value is used, it is then essential to reduce the pH to a pH value more acidic than pH 5-6 by the treatment with an acidic compound. Specifically, the treatment with an acidic compound is preferably carried out to reduce the pH to a value lower by 0.2-2 than the pH of water used in the water washing.

The modified natural rubber has a pH of 2 to 7, preferably 3 to 6, more preferably 4 to 6. When the pH of the modified natural rubber is adjusted within the range described above, the reduction of heat aging resistance is prevented and the above-described properties are markedly improved. The pH of the modified natural rubber is determined by cutting the rubber into pieces at most 2 mm square on each side, immersing the pieces in distilled water, irradiating the immersed pieces with microwaves for extraction at 90° C. for 15 minutes, and measuring the resulting immersion water with a pH meter. Specifically, the pH is determined by a method described later in the examples. Regarding the extraction, one-hour extraction using an ultrasonic washing device or the like cannot completely extract water-soluble components from the inside of rubber and thus cannot reveal the pH of the inside accurately. In contrast, the present inventors have found out that extraction by the above-described technique can elucidate the real nature of rubber.

The modified natural rubber has been highly purified by any of various methods, including the methods (1) to (3). For example, the modified natural rubber preferably has a phosphorus content of 200 ppm or less, more preferably 150 ppm or less. When the phosphorus content is more than 200 ppm, the Mooney viscosity may increase during storage so that processability deteriorates, and the tan δ may increase so that fuel economy cannot be improved. The phosphorus content can be measured by conventional methods, such as ICP emission analysis. The phosphorus is presumably derived from phospholipids in natural rubber.

In the case of the modified natural rubber containing an artificial antioxidant, the modified natural rubber preferably has a nitrogen content of 0.15% by mass or less, more preferably 0.1% by mass or less after it is immersed in acetone at room temperature (25° C.) for 48 hours. When the nitrogen content is more than 0.15% by mass, the Mooney viscosity may increase during storage so that processability deteriorates, and the effect of improving fuel economy may be insufficient. Highly purified natural rubber, which is free of natural antioxidant components that natural rubber is thought to contain by nature, may deteriorate during long-term storage. To address this problem, artificial antioxidants may be added in some cases. The nitrogen content is measured after the artificial antioxidants in the rubber are removed by extraction with acetone. The nitrogen content can be measured by conventional methods, such as the Kjeldahl method or the use of a trace nitrogen analyzer. The nitrogen is derived from proteins and amino acids.

The modified natural rubber preferably has a Mooney viscosity ML (1+4) at 130° C. of 75 or less, more preferably of 40 to 75, still more preferably 45 to 75, particularly preferably 50 to 70, most preferably 55 to 65, as measured in accordance with JIS K 6300:2001-1. The modified natural rubber having a Mooney viscosity of 75 or less does not need mastication which is usually necessary before kneading of the rubber. Such a modified natural rubber prepared without the mastication process can be suitably used as a compounding material for preparing rubber compositions. On the other hand, the modified natural rubber having a Mooney viscosity of more than 75 needs mastication before use, which tends to cause disadvantages such as the need of dedicated equipment, a loss of electricity or thermal energy, and the like.

The modified natural rubber preferably has a heat aging resistance index of 75 to 120%, wherein the heat aging resistance index is defined by the equation below based on Mooney viscosities ML (1+4) at 130° C. determined as above. Heat aging resistance index (%)=(Mooney viscosity of the modified natural rubber measured after heat treatment at 80° C. for 18 hours)/(Mooney viscosity of the modified natural rubber before the heat treatment)×100

The heat aging resistance index defined by the equation is more preferably 80 to 115%, still more preferably 85 to 110%. Although various methods for evaluating heat aging resistance of rubber are reported, heat aging resistance, such as during the production or service of tires, can be accurately evaluated by measuring the rate of change in the Mooney viscosity ML (1+4) at 130° C. before and after heat treatment at 80° C. for 18 hours. When the heat aging resistance index falls within the range described above, excellent heat aging resistance is obtained, and the balance of the above-described properties is markedly improved.

The highly purified, modified natural rubber having a pH adjusted to 2 to 7, such as the rubbers (1) to (3), may be prepared by, for example, the following production method 1 or 2. The production method 1 includes step 1-1 of saponifying natural rubber latex, step 1-2 of washing the saponified natural rubber latex, and step 1-3 of treating the latex with an acidic compound. The production method 2 includes step 2-1 of deproteinizing natural rubber latex, step 2-2 of washing the deproteinized natural rubber latex, and step 2-3 of treating the latex with an acidic compound.

[Production Method 1]
(Step 1-1)

Step 1-1 includes saponifying natural rubber latex. This treatment decomposes phospholipids and proteins in the rubber, thereby providing a saponified natural rubber latex containing a reduced amount of non-rubber components.

Natural rubber latex is collected as sap of natural rubber trees such as hevea trees. It contains components including water, proteins, lipids, and inorganic salts as well as a rubber component. The gel fraction in the rubber is considered to be derived from a complex of various impurities therein. In the present invention, the natural rubber latex to be used may be a raw latex (field latex) taken from hevea trees by tapping, or a concentrated latex prepared by concentration via centrifugation or creaming (e.g., purified latex, high-ammonia latex prepared by adding ammonia in a conventional manner, or LATZ latex which has been stabilized with zinc oxide, TMTD, and ammonia).

The saponification may be suitably carried out by, for example, the methods disclosed in JP 2010-138359 A and JP 2010-174169 A. Specifically, the saponification may be carried out as follows, for example.

The saponification may be carried out by adding an alkali and optionally a surfactant to natural rubber latex and leaving the mixture for a certain period of time at a predetermined temperature. Stirring or the like may be performed as needed.

The alkali to be used in the saponification is preferably, but not limited to, sodium hydroxide, potassium hydroxide, or the like. Non-limiting examples of the surfactant include known anionic surfactants, nonionic surfactants, and amphoteric surfactants, such as polyoxyethylene alkyl ether sulfates. Suitable are anionic surfactants such as polyoxyethylene alkyl ether sulfates because they allow saponification to be well achieved without solidifying rubber. In the saponification, the amounts of the alkali and the surfactant, and the temperature and duration of the saponification may be chosen appropriately.

(Step 1-2)

Step 1-2 includes washing the saponified natural rubber latex obtained in step 1-1. Non-rubber components such as proteins are removed by the washing.

For example, step 1-2 may be carried out by coagulating the saponified natural rubber latex obtained in step 1-1 to produce a coagulated rubber, treating the coagulated rubber with a basic compound, and then washing the resultant rubber. Specifically, after a coagulated rubber is produced, it is diluted with water to transfer the water-soluble components to the aqueous phase, and then the water is removed, whereby the non-rubber components can be removed. Further, the coagulated rubber is treated with a basic compound so that the non-rubber components which have been trapped inside the rubber during the coagulation can be redissolved. Thus, non-rubber components such as proteins firmly attached inside the coagulated rubber can be removed.

An exemplary coagulation method may include adding an acid, such as formic acid, acetic acid, or sulfuric acid, to adjust the pH, and optionally further adding a polymer flocculant. This does not produce large coagula, but produces a particulate rubber having a diameter in the order of between not more than one to a few millimeters and 20 mm, and then proteins and the like in such a rubber are sufficiently removed by the treatment with a basic compound. The pH is preferably adjusted within the range of 3.0 to 5.0, more preferably 3.5 to 4.5.

Examples of the polymer flocculant include cationic polymer flocculants such as poly(dimethylaminoethyl (meth) acrylate methyl chloride quaternary salt); anionic polymer flocculants such as poly(acrylates); nonionic polymer flocculants such as polyacrylamide; and amphoteric polymer flocculants such as a copolymer of a dimethylaminoethyl (meth) acrylate methyl chloride quaternary salt and an acrylate. The amount of the polymer flocculant may be chosen appropriately.

Then, the coagulated rubber thus obtained is treated with a basic compound. Although the basic compound is not particularly limited, basic inorganic compounds are suitable because of their ability to remove proteins and the like.

Examples of the basic inorganic compound include metal hydroxides such as alkali metal hydroxides and alkaline earth metal hydroxides; metal carbonates such as alkali metal carbonates and alkaline earth metal carbonates; metal hydrogen carbonates such as alkali metal hydrogen carbonates; metal phosphates such as alkali metal phosphates; metal acetates such as alkali metal acetates; metal hydrides such as alkali metal hydrides; and ammonia.

Examples of alkali metal hydroxides include lithium hydroxide, sodium hydroxide, and potassium hydroxide.

Examples of alkaline earth metal hydroxides include magnesium hydroxide, calcium hydroxide, and barium hydroxide. Examples of alkali metal carbonates include lithium carbonate, sodium carbonate, and potassium carbonate. Examples of alkaline earth metal carbonates include magnesium carbonate, calcium carbonate, and barium carbonate. Examples of alkali metal hydrogen carbonates include lithium hydrogen carbonate, sodium hydrogen carbonate, and potassium hydrogen carbonate. Examples of alkali metal phosphates include sodium phosphate and sodium hydrogen phosphate. Examples of alkali metal acetates include sodium acetate and potassium acetate. Examples of alkali metal hydrides include sodium hydride and potassium hydride.

Preferred among these are metal hydroxides, metal carbonates, metal hydrogen carbonates, metal phosphates, and ammonia; more preferred are alkali metal carbonates, alkali metal hydrogen carbonates, and ammonia; still more preferred is sodium carbonate or sodium hydrogen carbonate. Each of the basic compounds may be used alone, or two or more of them may be used in combination.

The coagulated rubber may be treated with a basic compound by any method that allows the coagulated rubber to be brought into contact with the basic compound. Examples include a method of immersing the coagulated rubber in an aqueous solution of the basic compound, and a method of spraying an aqueous solution of the basic compound onto the coagulated rubber. The aqueous solution of the basic compound can be prepared by diluting and dissolving the basic compound in water.

The amount of the basic compound based on 100% by mass of the aqueous solution is preferably 0.1% by mass or more, more preferably 0.3% by mass or more. When the amount is less than 0.1% by mass, the proteins may not be sufficiently removed. The amount of the basic compound is preferably 10% by mass or less, more preferably 5% by mass or less. When the amount is more than 10% by mass, in spite of such a large amount of the basic compound taken, the amount of decomposed proteins will not increase and the efficiency tends to be poor.

The aqueous solution of the basic compound preferably has a pH of 9 to 13. In view of treatment efficiency, the pH is more preferably 10 to 12.

The treatment temperature may be chosen appropriately, and it is preferably 10° C. to 50° C., more preferably 15° C. to 35° C. Moreover, the treatment duration is usually 1 minute or longer, preferably 10 minutes or longer, more preferably 30 minutes or longer. When the duration is shorter than 1 minute, the effects of the present invention may not be well achieved. Although the upper limit is not limited, the duration is preferably 48 hours or shorter, more preferably 24 hours or shorter, still more preferably 16 hours or shorter, in view of productivity.

Washing is performed after the treatment with a basic compound. This treatment allows the non-rubber components such as proteins which have been trapped inside the rubber during the coagulation to be sufficiently removed and, at the same time, allows the basic compounds present inside the coagulated rubber as well as those on the surface to be sufficiently removed. In particular, the removal of the basic compounds remaining in the entire rubber in the washing step permits the entire rubber to sufficiently undergo treatment with an acidic compound as described later. Thus, the pH of not only the surface but also the inside of the rubber can be adjusted to 2 to 7.

The washing can be suitably carried out by methods that can sufficiently remove the non-rubber components and the basic compounds contained in the entire rubber. For example, the washing may be carried out by a method in which the rubber component is diluted and washed in water, followed by centrifugation or followed by standing to allow the rubber to float and then draining only the aqueous phase to collect the rubber component. The number of washing cycles may be arbitrarily chosen as long as the amounts of non-rubber components such as proteins and of the basic compound can be reduced to desired levels. In the case of repeating a washing cycle which consists of adding 1,000 mL of water per 300 g of dry rubber, stirring the mixture, and then removing water, the number of washing cycles is preferably 3 (3 cycles) or more, more preferably 5 (5 cycles) or more, still more preferably 7 (7 cycles) or more.

The washing is preferably performed until the rubber has a phosphorus content of 200 ppm or less and/or has a nitrogen content of 0.15% by mass or less. When the washing is carried out so that phospholipids and proteins are sufficiently removed, the above-described properties are improved.

(Step 1-3)

Step 1-3 includes treating the washed rubber obtained in step 1-2 with an acidic compound. This treatment adjusts the pH of the entire rubber to 2 to 7 as described above, thereby providing a modified natural rubber excellent in the above-described properties. Although heat aging resistance tends to be reduced by the treatment with a basic compound or the like, an additional treatment with an acidic compound prevents such a problem and provides good heat aging resistance.

Non-limiting examples of the acidic compound include inorganic acids such as hydrochloric acid, nitric acid, sulfuric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, methanesulfonic acid, itaconic acid, benzenesulfonic acid, toluenesulfonic acid, naphthalenedisulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, $\alpha$-resorcylic acid, $\beta$-resorcylic acid, $\gamma$-resorcylic acid, gallic acid, phloroglycine, sulfosalicylic acid, ascorbic acid, erythorbic acid, and bisphenolic acids. Preferred among these are acetic acid, sulfuric acid, formic acid, and the like. Each of the acidic compounds may be used alone, or two or more of them may be used in combination.

The coagulated rubber may be treated with an acid by any method that allows the coagulated rubber to be brought into contact with the acidic compound. Examples include a method of immersing the coagulated rubber in an aqueous solution of the acidic compound, and a method of spraying an aqueous solution of the acidic compound onto the coagulated rubber. The aqueous solution of the acidic compound can be prepared by diluting and dissolving the acidic compound in water.

Although the amount of the acidic compound based on 100% by mass of the aqueous solution is not particularly limited, the lower limit is preferably 0.1% by mass or more, more preferably 0.3% by mass or more, while the upper limit is preferably 15% by mass or less, more preferably 10% by mass or less, still more preferably 5% by mass or less. When the amount falls within the range described above, good heat aging resistance can be obtained.

The treatment temperature may be chosen appropriately, and it is preferably 10° C. to 50° C., more preferably 15° C. to 35° C. Usually, the treatment duration is preferably 3 seconds or longer, more preferably 10 seconds or longer, still more preferably 30 seconds or longer. When the duration is shorter than 3 seconds, the rubber may not be sufficiently neutralized and therefore the effects of the present invention may not be well achieved. Although the upper limit is not limited, the duration is preferably 24 hours or shorter, more preferably 10 hours or shorter, still more preferably 5 hours or shorter, in view of productivity.

In the treatment such as by immersion in an aqueous solution of the acidic compound, the pH is preferably adjusted to 6 or lower.

Such neutralization results in excellent heat aging resistance. The upper limit of the pH is more preferably 5 or lower, still more preferably 4.5 or lower. The lower limit of the pH is not particularly limited, and it is preferably 1 or higher, more preferably 2 or higher, because too strong acidity may cause degradation of the rubber and may complicate the wastewater disposal, though depending on the duration of immersion. The immersing treatment may be carried out, for example, by leaving the coagulated rubber in an aqueous solution of the acidic compound.

After the above treatment, the compound used in the treatment with an acidic compound is removed, and then the treated coagulated rubber may appropriately be washed. The washing may be carried out in the same manner as described above. For example, the amount of non-rubber components may be further reduced and adjusted to a desired level by repeating washing. Moreover, the coagulated rubber obtained after the treatment with an acidic compound may be squeezed with, for example, a roll squeezer into a sheet shape or the like. The additional step of squeezing the coagulated rubber allows the surface and inside of the coagulated rubber to have a uniform pH, and the resulting rubber has desired properties. After the washing and/or squeezing steps are performed as needed, the resultant rubber is milled on a creper and dried, whereby the modified natural rubber can be obtained. The drying may be carried out in any manner, such as by using a common drier for drying TSR, e.g. a trolley dryer, a vacuum dryer, an air dryer, or a drum dryer.

[Production Method 2]
(Step 2-1)

Step 2-1 includes deproteinizing natural rubber latex. This treatment produces a deproteinized natural rubber latex that is free of non-rubber components such as proteins. The natural rubber latex to be used in step 2-1 may be the same as described above.

The deproteinizing treatment may be carried out by any known method by which proteins can be removed. An exemplary method may include adding a proteolytic enzyme to natural rubber latex to decompose proteins.

The proteolytic enzyme to be used in the deproteinizing treatment may be, but is not limited to, any of bacteria-derived enzymes, mold-derived enzymes, and yeast-derived enzymes. Specifically, one or a combination of proteases, peptidases, cellulases, pectinases, lipases, esterases, amylases, and the like may be used.

The amount of the proteolytic enzyme to be added is preferably 0.005 parts by mass or more, more preferably 0.01 parts by mass or more, still more preferably 0.05 parts by mass or more, per 100 parts by mass of solids in the natural rubber latex. An amount of less than the lower limit may result in an insufficient proteolytic reaction.

A surfactant may also be added together with the proteolytic enzyme in the deproteinizing treatment. Examples of the surfactant include anionic surfactants, cationic surfactants, nonionic surfactants, and amphoteric surfactants.

(Step 2-2)

Step 2-2 includes washing the deproteinized natural rubber latex obtained in step 2-1. Non-rubber components such as proteins are removed by the washing.

Step 2-2 may be carried out, for example, by coagulating the deproteinized natural rubber latex obtained in step 2-1 to produce a coagulated rubber, and washing the coagulated rubber. Thus, non-rubber components such as proteins firmly attached inside the coagulated rubber can be removed.

The coagulation may be carried out in the same manner as in step 1-2. Further, treatment with a basic compound as described above may optionally be performed. After a coagulated rubber is produced, washing is performed. This washing may be carried out in the same manner as in step 1-2, whereby non-rubber components such as proteins and the basic compound can be removed. For the same reason as described above, the washing is preferably performed until the rubber has a phosphorus content of 200 ppm or less and/or has a nitrogen content of 0.15% by mass or less.

(Step 2-3)

Step 2-3 includes treating the washed rubber obtained in step 2-2 with an acidic compound. Not only the treatment with a basic compound but also the acid coagulation using a small amount of acid tend to reduce heat aging resistance due to the fact that a water extract of the finally obtained rubber shows alkalinity or neutrality. Enzymes having an optimum pH in an alkali region are usually used as the proteolytic enzyme because they suitably allow for deproteinization. Such an enzymatic reaction is often carried out under alkaline conditions depending on the optimum pH. In order to adjust the pH of the final rubber to 2 to 7, natural rubber latex is preferably deproteinized at a pH of 8 to 11, more preferably a pH of 8.5 to 11 in step 2-1. The deproteinized latex is then solidified under acidic conditions in the coagulation process. When the solidified rubber was washed only with water, an extract of the rubber obtained in the extraction described later had a higher pH than the pH of the extracting solvent, and such a rubber showed a great reduction particularly in heat aging resistance. In contrast, when the solidified rubber is treated with an acidic compound, optionally following treatment with a basic compound, the above problem is prevented and good heat aging resistance is obtained.

The same acidic compounds as mentioned in step 1-3 can be used. Moreover, the coagulated rubber may be treated with an acid by any method that allows the coagulated rubber to be brought into contact with the acidic compound. Examples include a method of immersing the coagulated rubber in an aqueous solution of the acidic compound, and a method of spraying an aqueous solution of the acidic compound onto the coagulated rubber. The aqueous solution of the acidic compound can be prepared by diluting and dissolving the acidic compound in water.

Although the amount of the acidic compound based on 100% by mass of the aqueous solution is not particularly limited, the lower limit is preferably 0.01% by mass or more, more preferably 0.03% by mass or more, while the upper limit is preferably 15% by mass or less, more preferably 10% by mass or less, still more preferably 5% by mass or less. When the amount falls within the range described above, good heat aging resistance can be obtained.

The temperature and duration for the treatment may be chosen appropriately. The treatment may be carried out at the same temperature as in step 1-3. Moreover, in the treatment such as by immersion in an aqueous solution of the acidic compound, the pH is preferably adjusted to the same range as in step 1-3.

After the above treatment, the compound used in the treatment with an acidic compound is removed, and then the treated coagulated rubber may appropriately be washed. The washing may be carried out in the same manner as described above. For example, the amount of non-rubber components may be further reduced and adjusted to a desired level by repeating washing. After the completion of washing, the resultant rubber is dried, whereby the modified natural rubber can be obtained. The drying may be carried out in any manner, for example, by the above-described techniques.

In the case where the rubber composition of the present invention is for use in cap treads of summer tires, the amount of the modified natural rubber based on 100% by mass of the rubber component is preferably 5% by mass or more, more preferably 10% by mass or more, still more preferably 20% by mass or more. When the amount is less than 5% by mass, excellent fuel economy may not be obtained. The amount of the modified natural rubber is also preferably 80% by mass or less, more preferably 60% by mass or less, still more preferably 40% by mass or less. When the amount is more than 80% by mass, wet-grip performance may be reduced.

In the case where the rubber composition of the present invention is for use in cap treads of studless winter tires, the amount of the modified natural rubber based on 100% by mass of the rubber component is preferably 5% by mass or more, more preferably 30% by mass or more, still more preferably 40% by mass or more, particularly preferably 50% by mass or more. When the amount is less than 5% by mass, excellent fuel economy may not be obtained. The amount of the modified natural rubber is also preferably 90% by mass or less, more preferably 80% by mass or less, still more preferably 75% by mass or less. When the amount is more than 90% by mass, performance on snow and ice and abrasion resistance may be reduced.

In the case where the rubber composition of the present invention is for use in base treads, the amount of the modified natural rubber based on 100% by mass of the rubber component is preferably 5% by mass or more, more preferably 30% by mass or more, still more preferably 45% by mass or more, particularly preferably 60% by mass or more. When the amount is less than 5% by mass, excellent fuel economy may not be obtained. The amount of the modified natural rubber is also preferably 90% by mass or less, more preferably 80% by mass or less. When the amount is more than 90% by mass, handling stability may be reduced.

Examples of rubbers other than the modified natural rubber that can be used as the rubber component include natural rubber (unmodified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). In view of fuel economy and wet-grip performance, SBR is preferably incorporated. In view of low-temperature properties or durability, BR is preferably incorporated.

Non-limiting examples of the SBR include solution-polymerized SBR (S-SBR), emulsion-polymerized SBR (E-SBR), and modified SBR prepared therefrom. Examples of the modified SBR include SBR whose chain end and/or backbone is modified, and modified SBR (e.g. condensates, those having a branched structure) obtained by coupling with tin or silicon compounds or the like.

The SBR preferably has a styrene content of 5% by mass or more, more preferably 10% by mass or more, still more preferably 20% by mass or more. When the styrene content is less than 5% by mass, sufficient grip performance or rubber strength may not be obtained. The styrene content is also preferably 60% by mass or less, more preferably 50% by mass or less, still more preferably 45% by mass or less. When the styrene content is more than 60% by mass, excellent fuel economy may not be obtained. Herein, the styrene content of the SBR is determined by $^1$H-NMR.

The SBR preferably has a vinyl content of 10% by mass or more, more preferably 15% by mass or more, still more preferably 20% by mass or more. When the vinyl content is less than 10% by mass, sufficient grip performance or rubber strength may not be obtained. The vinyl content is also preferably 65% by mass or less, more preferably 60% by mass or less, still more preferably 30% by mass or less. When the vinyl content is more than 65% by mass, excellent fuel economy may not be obtained. Herein, the vinyl content of the SBR refers to the vinyl content in the butadiene portion and is determined by $^1$H-NMR.

In the case of the rubber composition for cap treads of summer tires, the amount of SBR based on 100% by mass of the rubber component is preferably 40% by mass or more, more preferably 50% by mass or more. When the amount is less than 40% by mass, sufficient grip performance may not be obtained. The amount of SBR is preferably 90% by mass or less, more preferably 80% by mass or less. When the amount is more than 90% by mass, the modified natural rubber may fail to provide excellent fuel economy.

Non-limiting examples of the BR include those commonly used in the tire industry. In order to ensure sufficient low-temperature properties or durability, the BR preferably has a cis content of 70% by mass or more, more preferably 90% by mass or more, still more preferably 97% by mass or more.

The BR preferably has a Mooney viscosity ($ML_{1+4}$ (100° C.)) of 10 or more, more preferably 30 or more. When the Mooney viscosity is less than 10, the dispersibility of filler tends to be reduced. The Mooney viscosity is preferably 120 or less, more preferably 80 or less. When the Mooney viscosity is more than 120, compound scorch (discoloration) may occur during extrusion processing.

The BR preferably has a molecular weight distribution (Mw/Mn) of 1.5 or more, more preferably 2.0 or more. When the Mw/Mn is less than 1.5, processability may deteriorate. The Mw/Mn of the BR is preferably 5.0 or less, more preferably 4.0 or less. When the Mw/Mn is more than 5.0, abrasion resistance and handling stability tend to deteriorate. The Mn and Mw values in the present invention are determined by GPC relative to polystyrene standards.

In the case of the rubber composition for cap treads of studless winter tires, from the standpoint of achieving required performance on snow and ice, the amount of BR based on 100% by mass of the rubber component is preferably 10% by mass or more, more preferably 20% by mass or more, still more preferably 30% by mass or more. Also, in view of processability, the amount of BR is preferably 80% by mass or less, more preferably 75% by mass or less, still more preferably 70% by mass or less.

In the case of the rubber composition for base treads, from the standpoint of achieving required handling stability, the amount of BR based on 100% by mass of the rubber component is preferably 5% by mass or more, more preferably 15% by mass or more. Also, in view of fuel economy and processability, the amount of BR is preferably 50% by mass or less, more preferably 40% by mass or less.

A silica having a CTAB specific surface area of 180 m$^2$/g or more and a BET specific surface area of 185 m$^2$/g or more (hereinafter, also referred to as "fine particle silica") is used in the rubber composition of the present invention. The combined use of such a fine particle silica and the modified natural rubber markedly improves the balance of the above-described properties.

The fine particle silica has a CTAB (cetyltrimethylammonium bromide) specific surface area of 180 m$^2$/g or more, preferably 190 m$^2$/g or more, more preferably 195 m$^2$/g or more, still more preferably 197 m$^2$/g or more. When the CTAB specific surface area is less than 180 m$^2$/g, the above-described properties tend not to be sufficiently improved. The CTAB specific surface area is preferably 600 m$^2$/g or less, more preferably 300 m$^2$/g or less, still more preferably 250 m$^2$/g or less. The fine particle silica having a CTAB specific surface area of more than 600 m$^2$/g has poor dispersibility and will aggregate, which tends to reduce physical properties.

The CTAB specific surface area is measured in accordance with ASTM D3765-92.

The fine particle silica has a BET specific surface area of 185 m$^2$/g or more, preferably 190 m$^2$/g or more, more preferably 195 m$^2$/g or more, still more preferably 210 m$^2$/g or more. When the BET specific surface area is less than 185 m$^2$/g, the above-described properties are less likely to be sufficiently improved. The BET specific surface area is preferably 600 m$^2$/g or less, more preferably 300 m$^2$/g or less, still more preferably 260 m$^2$/g or less. The fine particle silica having a BET specific surface area of more than 600 m$^2$/g has poor dispersibility and will aggregate, which tends to reduce physical properties.

The BET specific surface area of the silica is measured in accordance with ASTM D3037-81.

The fine particle silica preferably has an average primary particle size of 20 nm or less, more preferably 17 nm or less, still more preferably 16 nm or less, particularly preferably 15 nm or less. The lower limit of the average primary particle size is not particularly limited, and it is preferably 3 nm or more, more preferably 5 nm or more, still more preferably 7 nm or more. The fine particle silica, although having such a small average primary particle size, can aggregate to form a structure similar to that of carbon black, so that the dispersibility of silica can be further improved and therefore reinforcing properties and abrasion resistance can be further improved.

The average primary particle size of the fine particle silica can be determined by measuring the sizes of 400 or more primary particles of silica in a visual field observed with a transmission or scanning electron microscope, and calculating the average of the sizes.

The rubber composition of the present invention may contain silica other than the fine particle silica. In this case, the total amount of silica per 100 parts by mass of the rubber component is preferably 15 parts by mass or more, more preferably 25 parts by mass or more, still more preferably 45 parts by mass or more. The total amount of silica is also preferably 200 parts by mass or less, more preferably 150 parts by mass or less. When the total amount is less than the lower limit or higher than the upper limit, there are similar tendencies to those described for the amount of the fine particle silica.

A silane coupling agent may be used in combination with silica in the present invention. Examples of the silane coupling agent include bis(3-triethoxysilylpropyl)tetrasulfide, bis(3-triethoxysilylpropyl)trisulfide, and bis(3-triethoxysilylpropyl)disulfide. Among these, bis(3-triethoxysilylpropyl)tetrasulfide is preferred because it is highly effective in improving reinforcing properties.

The amount of silane coupling agent per 100 parts by mass of silica is preferably 1 part by mass or more, more preferably 2 parts by mass or more. When the amount is less than 1 part by mass, the coupling effect tends to be insufficient, thereby resulting in reduced fuel economy. The amount of silane coupling agent is also preferably 20 parts by mass or less, more preferably 15 parts by mass or less. When the amount is more than 20 parts by mass, the resulting rubber composition tends to be hard and the above-described properties tend to rather deteriorate.

The rubber composition preferably contains carbon black as filler in addition to silica. Non-limiting examples of the carbon black include GPF, FEF, HAF, ISAF, and SAF. Each of these carbon blacks may be used alone, or two or more of them may be used in combination.

The carbon black preferably has a nitrogen adsorption specific surface area (N$_2$SA) of 50 m$^2$/g or more, more preferably 60 m$^2$/g or more. The N$_2$SA is also preferably 250 m$^2$/g or less, more preferably 200 m$^2$/g or less, still more preferably 180 m$^2$/g or less, particularly preferably 150 m$^2$/g or less. The use of carbon black having an N$_2$SA of less than 50 m$^2$/g tends not to sufficiently produce a reinforcing effect. The use of carbon black having an N$_2$SA of more than 250 m$^2$/g tends to reduce fuel economy.

The nitrogen adsorption specific surface area of the carbon black is determined by the method A in accordance with JIS K 6217.

The amount of carbon black per 100 parts by mass of the rubber component is preferably 1 part by mass or more, more preferably 2 parts by mass or more. The amount of carbon black is preferably 150 parts by mass or less, more preferably 100 parts by mass or less. When the amount falls within the range described above, good fuel economy, good abrasion resistance, and good handling stability can be obtained.

The rubber composition preferably contains oil as a plasticizer. This makes it possible to adjust the hardness to an appropriately low level, thereby providing good processability. Non-limiting examples of oils that can be used include conventional oils, including process oils such as paraffinic process oils, aromatic process oils, and naphthenic process oils; low-PCA process oils such as TDAE and MES; vegetable fats and oils; and mixtures of the foregoing. From the viewpoint of the environment, low-PCA process oils are preferred among these. In order to achieve better low-temperature properties and excellent performance on snow and ice, paraffinic process oils are preferred. Specific examples of paraffinic process oils include PW-90, PW-150, and PS-32 all available from Idemitsu Kosan Co., Ltd.

In the case of the rubber composition for cap treads of summer tires, the amount of oil per 100 parts by mass of the rubber component is preferably 1 part by mass or more, more preferably 2 parts by mass or more. The amount of oil is also preferably 30 parts by mass or less, more preferably 20 parts by mass or less. When the amount falls within the range described above, excellent fuel economy and excellent wet-grip performance can be obtained while good processability is provided.

In the case of the rubber composition for cap treads of studless winter tires, the amount of oil per 100 parts by mass of the rubber component is preferably 5 parts by mass or more, more preferably 10 parts by mass or more, still more preferably 15 parts by mass or more. When the amount is less than 5 parts by mass, the effect of improving performance on snow and ice is less likely to be sufficiently produced. The amount of oil is also preferably 100 parts by mass or less, more preferably 80 parts by mass or less, still more preferably 50 parts by mass or less. When the amount is more than 100 parts by mass, abrasion resistance may be reduced and further reversion resistance may be reduced.

In the case of the rubber composition for base treads, the amount of oil per 100 parts by mass of the rubber component is preferably 1 part by mass or more, more preferably 3 parts by mass or more. The amount of oil is also preferably 20 parts by mass or less, more preferably 10 parts by mass or less. When the amount falls within the range described above, good processability can be obtained.

The rubber composition of the present invention may appropriately incorporate, in addition to the materials described above, various materials commonly used in the tire industry, such as zinc oxide, stearic acid, various types of antioxidants, plasticizers other than oil (e.g., wax), vulcanizing agents (e.g. sulfur, organic peroxides), and vulcanization accelerators (e.g. sulfenamide vulcanization accelerators, guanidine vulcanization accelerators).

The rubber composition of the present invention may be prepared by known methods, for example by kneading the above-described components using a rubber kneading machine such as an open roll mill or a Banbury mixer, and then vulcanizing the kneaded mixture.

The rubber composition of the present invention can be suitably used especially in treads (cap treads or base treads) of tires. The cap tread refers to an outer surface layer of a multilayer tread, which is to come into contact with the ground, while the base tread refers to an inner layer of a multilayer tread. Specifically, the base tread is a component shown in, for example, FIG. 1 of JP 2008-285628 A or FIG. 1 of JP 2008-303360 A.

A pneumatic tire formed from the rubber composition of the present invention can be produced by usual methods using the rubber composition. Specifically, the rubber composition incorporating additives as needed, before vulcanization, is extruded into the shape of a tire component such as a tread, and assembled with other tire components in a usual manner on a tire building machine to build an unvulcanized tire. The unvulcanized tire is heated and pressurized in a vulcanizer, whereby a tire can be produced.

The pneumatic tire of the present invention can be suitably used as a summer tire or studless winter tire for passenger vehicles or trucks and buses (heavy load vehicles).

EXAMPLES

The present invention will be specifically described with reference to, but not limited to, the examples below.

The chemicals used in the examples are listed below.

Field latex: Field latex available from Muhibbah Lateks

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of p-cresol and dicyclopentadiene) available from Eliokem Emulvin W (surfactant): Emulvin W (aromatic polyglycol ether) available from Lanxess Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt

NR: TSR 20

SBR: Buna VSL 2525-0 (styrene content: 25% by mass, vinyl content: 25% by mass) available from Lanxess BR: BR150B (cis content: 97% by mass, $ML_{1+4}$ (100° C.): 40, viscosity of 5% solution in toluene (25° C.): 48 cps, Mw/Mn: 3.3) available from Ube Industries, Ltd.

Carbon black 1: DIABLACK I (ISAF, $N_2SA$: 114 $m^2/g$, average particle size: 23 nm, DBP oil absorption: 114 mL/100 g) available from Mitsubishi Chemical Corporation Carbon black 2: Shoblack N330 (HAF, $N_2SA$: 75 $m^2/g$) available from Cabot Japan K.K.

Silica 1: Zeosil HRS 1200MP (CTAB specific surface area: 195 $m^2/g$, BET specific surface area: 200 $m^2/g$, average primary particle size: 15 nm) available from Rhodia Japan Silica 2: Zeosil Premium 200MP (CTAB specific surface area: 200 $m^2/g$, BET specific surface area: 220 $m^2/g$, average primary particle size: 10 nm) available from Rhodia Japan Silica 3: Ultrasil VN3 (CTAB specific surface area: 175 $m^2/g$, BET specific surface area: 167 $m^2/g$, average primary particle size: 17 nm) available from Degussa Silane coupling agent: Si69 (bis(3-triethoxysilyl-propyl) tetrasulfide) available from Degussa Oil 1: Viva Tec 400 (TDAE) available from H & R Oil 2: PS-32 (paraffinic process oil) available from Idemitsu Kosan Co., Ltd.

Wax: Ozoace 0355 available from Nippon Seiro Co., Ltd.

Zinc oxide: Zinc oxide #2 available from Mitsui Mining and Smelting Co., Ltd.

Stearic acid: Stearic acid beads "Tsubaki" available from NOF Corporation

Antioxidant: Nocrac 6C (N-phenyl-N'-(1,3-dimethylbutyl)-p-phenylenediamine, 6PPD) available from Ouchi Shinko Chemical Industrial Co., Ltd.

Sulfur 1: Powdered sulfur available from Tsurumi Chemical Industry Co., Ltd.

Sulfur 2: Seimi Sulfur (oil content: 10%) available from Nippon Kanryu Industry Co., Ltd.

Vulcanization accelerator 1: Nocceler NS available from Ouchi Shinko Chemical Industrial Co., Ltd.

Vulcanization accelerator 2: Soxinol D available from Sumitomo Chemical Co., Ltd.

EXAMPLES AND COMPARATIVE EXAMPLES (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1,000 g) for 16 hours using a ball mill to prepare an antioxidant dispersion.

Production Example 1

The solids concentration (DRC) of field latex was adjusted to 30% (w/v). Then, 1,000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Thereafter, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1,000 mL of a 2% by mass aqueous solution of sodium carbonate for 4 hours at room temperature, and then the rubber was taken out. The rubber was combined with 2,000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, followed by stirring for 2 minutes. This cycle of operation was repeated three times. Then, water was squeezed off from the resultant rubber with a water squeezing roll to form the rubber into a sheet, followed by drying for 4 hours at 90° C. In this manner, a solid rubber (highly purified natural rubber A) was prepared.

Production Example 2

A solid rubber (highly purified natural rubber B) was prepared as in Production Example 1, except that 2% by mass formic acid was added until the pH reached 1.

Comparative Production Example 1

The solids concentration (DRC) of field latex was adjusted to 30% (w/v). Then, 1,000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Thereafter, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1,000 mL of a 2% by mass aqueous solution of sodium carbonate for 4 hours at room temperature, and then the rubber was taken out. The rubber was combined with 1,000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, followed by stirring for 2 minutes. This cycle of operation was repeated three times, followed by drying for 4 hours at 90° C. In this manner, a solid rubber (highly purified natural rubber C) was prepared.

Comparative Production Example 2

A solid rubber (highly purified natural rubber D) was prepared as in Production Example 1, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 3

A commercially available high-ammonia latex (available from MUHIBBAH LATEKS in Malaysia, solid rubber content: 62.0%) was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then, the pH was again adjusted to 9.2, and the resultant mixture was maintained at 37° C. for 24 hours.

Next, the latex obtained after completion of the enzymatic treatment was combined with a 1% aqueous solution of a nonionic surfactant (available from Kao Corporation under the trade name EMULGEN 810) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. A cationic polymer flocculant was further added, so that 0.5-5 mm rubber particles were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber E) was prepared.

Production Example 4

A solid rubber (highly purified natural rubber F) was prepared as in Production Example 3, except that 2% by mass formic acid was added until the pH reached 1.

Comparative Production Example 3

A commercially available high-ammonia latex (available from MUHIBBAH LATEKS in Malaysia, solid rubber content: 62.0%) was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then, the pH was again adjusted to 9.2, and the resultant mixture was maintained at 37° C. for 24 hours.

Next, the latex obtained after completion of the enzymatic treatment was combined with a 1% aqueous solution of a nonionic surfactant (available from Kao Corporation under the trade name EMULGEN 810) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out, and formed into a sheet using a creper while being washed with water, followed by drying for 4 hours at 90° C. In this manner, a solid rubber (highly purified natural rubber G) was prepared.

Comparative Production Example 4

A solid rubber (highly purified natural rubber H) was prepared as in Comparative Production Example 3, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

The solid rubbers prepared as above were evaluated as follows. Table 1 shows the results.

<Measurement of pH of Rubber>

The prepared rubber in an amount of 5 g was cut into pieces so that the sum of the three dimensions of each piece was 5 mm or less (about 1-2 mm×about 1-2 mm×about 1-2 mm). The pieces were placed in a 100 mL beaker and combined with 50 mL of distilled water at room temperature. The contents were heated to 90° C. over two minutes, followed by irradiation with microwaves (300 W) for 13 minutes (total 15 minutes) while adjusting and maintaining the temperature at 90° C. Then, after the resulting immersion water was cooled to 25° C. using an ice bath, the pH of the immersion water was measured with a pH meter.

<Measurement of Nitrogen Content>
(Acetone Extraction (Preparation of Specimen))

Each solid rubber was finely cut into sample pieces 1 mm square, and about 0.5 g of the sample was weighed. The sample was immersed in 50 g of acetone at room temperature (25° C.) for 48 hours. Then, the rubber was taken out and dried. Thus, specimens (from which antioxidants had been extracted) were prepared.

(Measurement)

The nitrogen content of the specimens was measured by the following method.

The acetone-extracted specimens obtained as above were decomposed and gasified using a trace nitrogen/carbon analyzer "SUMIGRAPH NC 95A (Sumika Chemical Analysis Service, Ltd.)", and the gas generated was analyzed using a gas chromatograph "GC-8A (Shimadzu Corporation)" to determine the nitrogen content.

<Measurement of Phosphorus Content>

The phosphorus content was determined using an ICP emission spectrometer (P-4010, Hitachi, Ltd.).

<Measurement of Gel Content>

The raw rubber was cut into 1 mm×1 mm sample pieces, and about 70 mg of the sample was accurately weighed. Thereto was added 35 mL of toluene, and the mixture was left in a cool, dark place for one week. Subsequently, the mixture was centrifuged so that a gel fraction that was insoluble in toluene was precipitated, and a toluene-soluble supernatant was removed. Only the gel fraction was solidified with methanol and then dried. The mass of the dried gel fraction was measured. The gel content (% by mass) was determined by the following equation:

Gel content (% by mass)=(mass (mg) after drying)/(initial mass (mg) of sample)×100.

<Heat Aging Resistance>

The Mooney viscosity ML (1+4) at 130° C. of the solid rubber was measured in accordance with JIS K 6300:2001-1 before and after being held at 80° C. for 18 hours. A heat aging resistance index was calculated by the above-described equation.

TABLE 1

| | Saponified natural rubber | | | | Deproteinized natural rubber | | | | |
| --- | --- | --- | --- | --- | --- | --- | --- | --- | --- |
| | Highly purified natural rubber A Production Example 1 | Highly purified natural rubber B Production Example 2 | Highly purified natural rubber C Comparative Production Example 1 | Highly purified natural rubber D Comparative Production Example 2 | Highly purified natural rubber E Production Example 3 | Highly purified natural rubber F Production Example 4 | Highly purified natural rubber G Comparative Production Example 3 | Highly purified natural rubber H Comparative Production Example 4 | Natural rubber TSR20 |
| pH | 5 | 3.8 | 8 | 8.5 | 4.9 | 3.6 | 8.1 | 9.5 | — |
| Nitrogen content (% by mass) | 0.07 | 0.07 | 0.08 | 0.07 | 0.02 | 0.02 | 0.02 | 0.02 | 0.36 |
| Phosphorus content (ppm) | 92 | 88 | 89 | 93 | 108 | 99 | 93 | 95 | 590 |
| Gel content (% by mass) | 6 | 7 | 8 | 6 | 9 | 10 | 8 | 7 | 29.8 |
| Mooney viscosity | 58 | 56 | 59 | 60 | 58 | 57 | 60 | 60 | 88 |
| Heat aging resistance (%) | 95 | 99 | 60 | 41 | 85 | 88 | 58 | 28 | 103 |

Table 1 shows that the modified natural rubbers having a pH ranging from 2 to 7 were superior in heat aging resistance to the rubbers having a pH outside the range.

<Preparation of Unvulcanized Rubber Composition and Test Tire>

According to the formulations shown in Tables 2 to 4, the chemicals other than the sulfur and the vulcanization accelerator(s) were kneaded using a 1.7 L Banbury mixer. Next, the sulfur and the vulcanization accelerator(s) were kneaded with the kneaded mixture using a roll to prepare an unvulcanized rubber composition. The unvulcanized rubber composition was formed into the shape of a cap tread or a base tread and assembled with other tire components on a tire building machine to build an unvulcanized tire. The unvulcanized tire was vulcanized at 170° C. for 10 minutes to prepare a test tire (size: 195/65R15, summer tire for passenger vehicles (cap tread or base tread) or studless winter tire (cap tread). The unvulcanized rubber compositions and test tires prepared as above were evaluated as described below. Tables 2 to 4 show the results. Comparative Examples 1-1, 2-1, and 3-1 were taken as reference comparative examples in the respective tables.

<Processability Index>

The Mooney viscosity of the unvulcanized rubber compositions was measured at 130° C. in accordance with JIS K 6300. The Mooney viscosity ($ML_{1+4}$) values are expressed as an index using the equation below, with the reference comparative example set equal to 100. A higher index indicates a lower Mooney viscosity and better processability.

(Processability index)=($ML_{1+4}$ of reference comparative example)/($ML_{1+4}$ of each formulation)×100

<Fuel Economy (Rolling Resistance Index)>

The rolling resistance of the test tires was measured using a rolling resistance tester by running each test tire mounted on a 15×6 JJ rim at an internal pressure of 230 kPa, a load of 3.43 kN, and a speed of 80 km/h. The results are expressed as an index, with the reference comparative example set equal to 100. A higher index indicates a better result (better fuel economy).

<Wet-Grip Performance Index>

Each set of test tires were mounted on all the wheels of a vehicle (front-engine, front-wheel-drive car, 2,000 cc, made in Japan), and the braking distance from an initial speed of 100 km/h on a wet asphalt road was determined. The results are expressed as an index. A higher index indicates better wet-skid performance (wet-grip performance). The index was determined using the following equation:

Wet-skid performance=(Braking distance of reference comparative example)/(Braking distance of each formulation)×100

<Performance on Snow and Ice (Grip Performance on Ice)>

The performance of the test tires mounted on a vehicle on ice was evaluated under the following conditions. The test tires were mounted on a front-engine, rear-wheel-drive car of 2,000 cc displacement made in Japan. The test was performed in a test track (on ice) at the Asahikawa Tire Proving Ground of Sumitomo Rubber Industries, Ltd. in Hokkaido, Japan. The temperature on ice was −6° C. to −1° C.

Braking performance (Brake stopping distance on ice): The stopping distance on ice was measured which was the distance required to stop after the brakes that lock up were applied at 30 km/h. The results are expressed as an index using the equation below, with the reference comparative example set equal to 100. A higher index indicates better braking performance on ice.

(Index of grip performance on ice)=(Stopping distance of reference comparative example)/(Stopping distance of each formulation)×100

<Abrasion Resistance>

Each set of test tires were mounted on a front-engine, front-wheel-drive car made in Japan. After a mileage of 8,000 km, the groove depth in the tire tread portion was measured. The distance at which the tire groove depth decreased by 1 mm was calculated and expressed as an index using the equation below. A higher index indicates better abrasion resistance.

Abrasion resistance index=(Distance at which tire groove depth of each formulation decreased by 1 mm)/(Distance at which tire groove depth of reference comparative example decreased by 1 mm)×100

<Handling stability>

The test tires were mounted on all the wheels of a vehicle (front-engine, front-wheel-drive car, 2,000 cc, made in Japan). A test driver drove the vehicle in a test track and subjectively evaluated handling stability. The evaluation was based on a scale of 1-10, with 10 being the best. The handling stability of the test tires was evaluated relative to that of the reference comparative example, which was assigned a score of 6. A higher score indicates better handling stability.

TABLE 2

Rubber composition for cap treads of summer tires

| | | Saponified natural rubber | | | | | | | | Deproteinized natural rubber | | | | | Natural rubber |
|---|---|---|---|---|---|---|---|---|---|---|---|---|---|---|---|
| | | Example | | | | | Comparative Example | | | Example | | | Comparative Example | | Comparative Example |
| | | 1-1 | 1-2 | 1-3 | 1-4 | 1-5 | 1-1 | 1-2 | 1-3 | 1-6 | 1-7 | 1-8 | 1-4 | 1-5 | 1-6 |
| Formulation (parts by mass) | Highly purified natural rubber A | 30 | 30 | 30 | 30 | — | — | — | — | — | — | — | — | — | — |
| | Highly purified natural rubber B | — | — | — | — | 30 | — | — | — | — | — | — | — | — | — |
| | Highly purified natural rubber C | — | — | — | — | — | 30 | — | 30 | — | — | — | — | — | — |
| | Highly purified natural rubber D | — | — | — | — | — | — | 30 | — | — | — | — | — | — | — |
| | Highly purified natural rubber E | — | — | — | — | — | — | — | — | 30 | 30 | — | — | — | — |
| | Highly purified natural rubber F | — | — | — | — | — | — | — | — | — | — | 30 | — | — | — |
| | Highly purified natural rubber G | — | — | — | — | — | — | — | — | — | — | — | 30 | — | — |
| | Highly purified natural rubber H | — | — | — | — | — | — | — | — | — | — | — | — | 30 | — |
| | NR | — | — | — | — | — | — | — | — | — | — | — | — | — | 30 |
| | SBR | 70 | 70 | 70 | 70 | 70 | 70 | 70 | 70 | 70 | 70 | 70 | 70 | 70 | 70 |
| | Carbon black 1 | 20 | 80 | 20 | 80 | 20 | 20 | 20 | 80 | 20 | 20 | 20 | 20 | 20 | 20 |
| | Silica 1 | 80 | 10 | — | — | 80 | — | — | — | 80 | — | 80 | — | — | — |
| | Silica 2 | — | — | 80 | 20 | — | — | — | — | — | 80 | — | — | — | — |
| | Silica 3 | — | — | — | — | — | 80 | 80 | 20 | — | — | — | 80 | 80 | 80 |
| | Silane coupling agent | 4 | 1 | 4 | 1 | 4 | 4 | 4 | 1 | 4 | 4 | 4 | 4 | 4 | 4 |
| | Stearic acid | 2 | 2 | 2 | 2 | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 | 2 | 2 | 2 | 2 |
| | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 |
| | Wax | 1.5 | 1.5 | 1.5 | 1.5 | 1.5 | 1.5 | 1.5 | 1.5 | 1.5 | 1.5 | 1.5 | 1.5 | 1.5 | 1.5 |
| | Oil 1 | 15 | 15 | 15 | 15 | 15 | 15 | 15 | 15 | 15 | 15 | 15 | 15 | 15 | 15 |
| | Sulfur 1 | 2 | 2 | 2 | 2 | 2 | 2 | 2 | 2 | 2 | 2 | 2 | 2 | 2 | 2 |
| | Vulcanization accelerator 1 | 1 | 1 | 1 | 1 | 1 | 1 | 1 | 1 | 1 | 1 | 1 | 1 | 1 | 1 |

TABLE 2-continued

Rubber composition for cap treads of summer tires

| | | Saponified natural rubber | | | | | | | | Deproteinized natural rubber | | | | | Natural rubber |
|---|---|---|---|---|---|---|---|---|---|---|---|---|---|---|---|
| | | Example | | | | | Comparative Example | | | Example | | | Comparative Example | | Comparative Example |
| | | 1-1 | 1-2 | 1-3 | 1-4 | 1-5 | 1-1 | 1-2 | 1-3 | 1-6 | 1-7 | 1-8 | 1-4 | 1-5 | 1-6 |
| Evaluation | Processability | 105 | 106 | 100 | 103 | 106 | 100 | 98 | 103 | 103 | 100 | 104 | 103 | 98 | 80 |
| | Rolling resistance index | 113 | 97 | 113 | 95 | 115 | 100 | 93 | 91 | 113 | 113 | 114 | 98 | 97 | 95 |
| | Wet-grip performance index | 113 | 101 | 118 | 101 | 115 | 100 | 99 | 89 | 113 | 118 | 119 | 98 | 97 | 97 |
| | Abrasion resistance index | 117 | 118 | 122 | 123 | 119 | 100 | 97 | 108 | 114 | 120 | 121 | 97 | 96 | 95 |

TABLE 3

Rubber composition for cap treads of studless winter tires

| | | Saponified natural rubber | | | | | | | | | | Deproteinized natural rubber | | | | | Natural rubber |
|---|---|---|---|---|---|---|---|---|---|---|---|---|---|---|---|---|---|
| | | Example | | | | | | | Comparative Example | | | Example | | | Comparative Example | | Comparative Example |
| | | 2-1 | 2-2 | 2-3 | 2-4 | 2-5 | 2-6 | 2-7 | 2-1 | 2-2 | 2-3 | 2-8 | 2-9 | 2-10 | 2-4 | 2-5 | 2-6 |
| Formulation (parts by mass) | Highly purified natural rubber A | 60 | 60 | 60 | 60 | 60 | 60 | — | — | — | — | — | — | — | — | — | — |
| | Highly purified natural rubber B | — | — | — | — | — | — | 60 | — | — | — | — | — | — | — | — | — |
| | Highly purified natural rubber C | — | — | — | — | — | — | — | 60 | — | 60 | — | — | — | — | — | — |
| | Highly purified natural rubber D | — | — | — | — | — | — | — | — | 60 | — | — | — | — | — | — | — |
| | Highly purified natural rubber E | — | — | — | — | — | — | — | — | — | — | 60 | 60 | — | — | — | — |
| | Highly purified natural rubber F | — | — | — | — | — | — | — | — | — | — | — | — | 60 | — | — | — |
| | Highly purified natural rubber G | — | — | — | — | — | — | — | — | — | — | — | — | — | 60 | — | — |
| | Highly purified natural rubber H | — | — | — | — | — | — | — | — | — | — | — | — | — | — | 60 | — |
| | NR | — | — | — | — | — | — | — | — | — | — | — | — | — | — | — | 60 |
| | BR | 40 | 40 | 40 | 40 | 40 | 40 | 40 | 40 | 40 | 40 | 40 | 40 | 40 | 40 | 40 | 40 |
| | Carbon black 1 | 10 | 10 | 50 | 10 | 10 | 50 | 10 | 10 | 10 | 50 | 10 | 10 | 10 | 10 | 10 | 10 |
| | Silica 1 | 60 | 100 | 10 | — | — | — | 60 | — | — | — | 60 | — | 60 | — | — | — |
| | Silica 2 | — | — | — | 60 | 100 | 10 | — | — | — | — | — | 60 | — | — | — | — |
| | Silica 3 | — | — | — | — | — | — | — | 60 | 60 | 10 | — | — | — | 60 | 60 | 60 |
| | Silane coupling agent | 4 | 4 | 1 | 4 | 4 | 1 | 4 | 4 | 4 | 1 | 4 | 4 | 4 | 4 | 4 | 4 |
| | Stearic acid | 2 | 2 | 2 | 2 | 2 | 2 | 2 | 2 | 2 | 2 | 2 | 2 | 2 | 2 | 2 | 2 |
| | Zinc oxide | 3 | 3 | 3 | 3 | 3 | 3 | 3 | 3 | 3 | 3 | 3 | 3 | 3 | 3 | 3 | 3 |
| | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Wax | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Oil 2 | 40 | 40 | 40 | 40 | 40 | 40 | 40 | 40 | 40 | 40 | 40 | 40 | 40 | 40 | 40 | 40 |
| | Sulfur 1 | 2 | 2 | 2 | 2 | 2 | 2 | 2 | 2 | 2 | 2 | 2 | 2 | 2 | 2 | 2 | 2 |
| | Vulcanization accelerator 1 | 1 | 1 | 1 | 1 | 1 | 1 | 1 | 1 | 1 | 1 | 1 | 1 | 1 | 1 | 1 | 1 |
| Evaluation | Processability | 104 | 97 | 102 | 103 | 96 | 103 | 106 | 100 | 98 | 100 | 103 | 102 | 104 | 100 | 99 | 82 |
| | Rolling resistance index | 116 | 118 | 108 | 116 | 111 | 94 | 118 | 100 | 97 | 89 | 113 | 113 | 119 | 97 | 96 | 94 |
| | Index of grip performance on ice | 113 | 114 | 107 | 118 | 120 | 94 | 113 | 100 | 99 | 90 | 112 | 117 | 115 | 98 | 98 | 98 |
| | Abrasion resistance index | 114 | 122 | 114 | 120 | 127 | 120 | 116 | 100 | 99 | 104 | 113 | 118 | 116 | 98 | 97 | 101 |

TABLE 4

Rubber composition for base treads

| | | Saponified natural rubber | | | | | | | Deproteinized natural rubber | | Natural rubber |
|---|---|---|---|---|---|---|---|---|---|---|---|
| | | Example | | | | | | Comparative Example | Example | Comparative Example | Comparative Example |
| | | 3-1 | 3-2 | 3-3 | 3-4 | 3-5 | 3-6 | 3-7 | 3-1 | 3-8 | 3-9 | 3-2 | 3-3 |

| | | 3-1 | 3-2 | 3-3 | 3-4 | 3-5 | 3-6 | 3-7 | 3-1 | 3-8 | 3-9 | 3-2 | 3-3 |
|---|---|---|---|---|---|---|---|---|---|---|---|---|---|
| Formulation (parts by mass) | Highly purified natural rubber A | 70 | 70 | 70 | 70 | 70 | 70 | — | — | — | — | — | — |
| | Highly purified natural rubber B | — | — | — | — | — | — | 70 | — | — | — | — | — |
| | Highly purified natural rubber C | — | — | — | — | — | — | — | 70 | — | — | — | — |
| | Highly purified natural rubber D | — | — | — | — | — | — | — | — | — | — | — | — |
| | Highly purified natural rubber E | — | — | — | — | — | — | — | — | 70 | — | — | — |
| | Highly purified natural rubber F | — | — | — | — | — | — | — | — | — | 70 | — | — |
| | Highly purified natural rubber G | — | — | — | — | — | — | — | — | — | — | 70 | — |
| | Highly purified natural rubber H | — | — | — | — | — | — | — | — | — | — | — | — |
| | NR | — | — | — | — | — | — | — | — | — | — | — | 70 |
| | BR | 30 | 30 | 30 | 30 | 30 | 30 | 30 | 30 | 30 | 30 | 30 | 30 |
| | Carbon black 2 | — | — | 30 | — | — | 30 | — | 40 | — | — | 40 | 40 |
| | Silica 1 | 45 | 100 | 10 | — | — | — | 45 | — | 45 | 45 | — | — |
| | Silica 2 | — | — | — | 45 | 100 | 10 | — | — | — | — | — | — |
| | Silica 3 | — | — | — | — | — | — | — | — | — | — | — | — |
| | Silane coupling agent | 3.6 | 3.6 | 1 | 3.6 | 3.6 | 1 | 3.6 | — | 3.6 | 3.6 | — | — |
| | Stearic acid | 2 | 2 | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 | 2 | 2 |
| | Wax | 1.5 | 1.5 | 1.5 | 1.5 | 1.5 | 1.5 | 1.5 | 1.5 | 1.5 | 1.5 | 1.5 | 1.5 |
| | Oil 1 | 5 | 5 | 5 | 5 | 5 | 5 | 5 | 5 | 5 | 5 | 5 | 5 |
| | Sulfur 2 | 2 | 2 | 2 | 2 | 2 | 2 | 2 | 2 | 2 | 2 | 2 | 2 |
| | Vulcanization accelerator 1 | 1 | 1 | 1 | 1 | 1 | 1 | 1 | 1 | 1 | 1 | 1 | 1 |
| | Vulcanization accelerator 2 | 0.5 | 0.5 | 0.5 | 0.5 | 0.5 | 0.5 | 0.5 | — | — | — | — | — |
| Evaluation | Processability | 107 | 103 | 102 | 105 | 103 | 103 | 106 | 100 | 106 | 107 | 100 | 81 |
| | Rolling resistance index | 109 | 106 | 100 | 108 | 105 | 99 | 109 | 100 | 108 | 109 | 99 | 95 |
| | Handling stability | 6.25 | 7.25 | 6.25 | 6.5 | 7.5 | 6.75 | 6.5 | 6 | 6.25 | 6.5 | 6 | 6.25 |

The results in Tables 1 to 4 demonstrate that a significant and balanced improvement in properties such as fuel economy, processability, heat aging resistance, abrasion resistance, wet-grip performance, performance on snow and ice, and handling stability was achieved in the examples using a combination of a highly purified natural rubber having a pH of 2 to 7 and a specific silane coupling agent.

The invention claimed is:

1. A rubber composition for tires, comprising:
a modified natural rubber having a phosphorus content of 200 ppm or less and further having a pH adjusted to 2 to 7, and
a silica having a CTAB specific surface area of 180 m$^2$/g or more and a BET specific surface area of 185 m$^2$/g or more.

2. The rubber composition for tires according to claim 1, wherein the modified natural rubber is obtained by removing non-rubber components in natural rubber, followed by treatment with an acidic compound, and the modified natural rubber has a pH of 2 to 7.

3. The rubber composition for tires according to claim 1, wherein the modified natural rubber is obtained by washing a saponified natural rubber latex and treating the washed saponified natural rubber latex with an acidic compound, and the modified natural rubber has a pH of 2 to 7.

4. The rubber composition for tires according to claim 1, wherein the modified natural rubber is obtained by washing a deproteinized natural rubber latex and treating the washed deproteinized natural rubber latex with an acidic compound, and the modified natural rubber has a pH of 2 to 7.

5. The rubber composition for tires according to claim 1, wherein the modified natural rubber has a nitrogen content of 0.15% by mass or less.

6. The rubber composition for tires according to claim 1, wherein the pH is determined by cutting the modified natural rubber into pieces at most 2 mm square on each side, immersing the pieces in distilled water, irradiating the immersed pieces with microwaves for extraction at 90° C. for 15 minutes, and measuring the resulting immersion water with a pH meter.

7. The rubber composition for tires according to claim 1, wherein the modified natural rubber has a heat aging resistance index of 75 to 120%, the heat aging resistance index being defined by the equation below based on Mooney viscosities ML (1 +4) at 130° C. measured in accordance with JIS K 6300:2001-1, Heat aging resistance index (%) =(Mooney viscosity of the modified natural rubber measured after heat treatment at 80° C. for 18 hours)/(Mooney viscosity of the modified natural rubber before the heat treatment)×100.

8. The rubber composition for tires according to claim 1, wherein the rubber composition contains a silane coupling agent.

9. The rubber composition for tires according to claim 1, wherein the silica has an average primary particle size of 16 nm or less.

10. The rubber composition for tires according to claim 1, wherein the modified natural rubber is prepared without mastication.

11. A pneumatic tire formed from the rubber composition according to claim 1.

12. A pneumatic tire formed from the rubber composition according to claim 2.

13. A pneumatic tire formed from the rubber composition according to claim 3.

14. A pneumatic tire formed from the rubber composition according to claim 4.

15. A pneumatic tire formed from the rubber composition according to claim 5.

16. A pneumatic tire formed from the rubber composition according to claim 6.

17. A pneumatic tire formed from the rubber composition according to claim 7.

* * * * *